E. H. LICHTENBERG.
MACHINE FOR DISTRIBUTING CONCRETE.
APPLICATION FILED JULY 19, 1920.

1,411,217.

Patented Mar. 28, 1922.
5 SHEETS—SHEET 1.

WITNESS:
E. K. Wagner

INVENTOR
E. H. Lichtenberg
BY Robt. Robt. Hill
ATTORNEYS

E. H. LICHTENBERG.
MACHINE FOR DISTRIBUTING CONCRETE.
APPLICATION FILED JULY 19, 1920.

1,411,217.

Patented Mar. 28, 1922.
5 SHEETS—SHEET 4.

UNITED STATES PATENT OFFICE.

ERICH H. LICHTENBERG, OF MILWAUKEE, WISCONSIN, ASSIGNOR, BY MESNE ASSIGNMENTS, TO KOEHRING COMPANY, OF MILWAUKEE, WISCONSIN, A CORPORATION OF WISCONSIN.

MACHINE FOR DISTRIBUTING CONCRETE.

1,411,217.   Specification of Letters Patent.   Patented Mar. 28, 1922.

Application filed July 19, 1920. Serial No. 397,431.

*To all whom it may concern:*

Be it known that I, ERICH H. LICHTENBERG, a citizen of the United States, residing at Milwaukee, in the county of Milwaukee and State of Wisconsin, have invented certain new and useful Improvements in Machines for Distributing Concrete, of which the following is a specification.

In the art of laying concrete roads, pavements and the like, there is commonly used as the most expeditious and economical method of distributing the concrete or mixed aggregates of which the pavement is composed, a machine which comprises, generally speaking, a combined mixer and boom and bucket distributing means. This machine, ordinarily known as the Koehring paver, embodies a portable plant which includes the concrete mixing drum and customary appurtenant control mechanisms, together with the boom and bucket attachment operated from the same power as used for the mixing machine and controlled by the same operator.

The chief desideratum of the present invention is the reduction of the labor expense involved in effecting the distribution of the concrete or mixed aggregates as incident to the operation of a paving machine of the class above described. By this machine the aggregates are commonly dumped in a pile upon a surface or sub-grade being paved, there to be distributed by laborers of whom two or more will be used for the spreading of the aggregates after they have been deposited upon the surface of the sub-grade. In the practical embodiment of a machine of this character, I have so designed the distributing bucket of the boom and bucket device previously referred to, and have so improved the controlling means of the operation of said bucket as to cause the aggregates of concrete delivered from the said receptacle to be deposited upon the sub-grade surface in a stream-like manner and of a predetermined thickness or depth, variable on account of the provision of special means for this particular purpose. That is to say, instead of depositing the aggregates in piles to be subsequently spread by expensive labor, my boom and bucket mechanism as now improved in comparison with the mechanism of my previous Letters Patent No. 1,141,470 and No. 1,113,661 issued June 1, 1915, and October 13, 1914, respectively, permits the concrete to be delivered to the surface on which it is to be laid in a ribbon-like stream of approximately rectangular formation in cross section, the depth or thickness of the layer of aggregates deposited being susceptible of variations according to the specifications of the particular contract governing the work. This constitutes also my novel method.

For the accomplishment of the foregoing I have redesigned the bucket and boom arrangements and the openable bucket door mechanism of my previous patents above identified.

In addition to the foregoing, among other objects of my invention, have been the simplifying of the driving mechanism utilized for causing the bucket to traverse the boom by which the distribution of the concrete over a relatively large area may be performed; the provision of a more positive driving mechanism for the purpose just outlined; and the improvement of certain knock-out or clutch neutralizing devices, certain of which have been heretofore proposed by me for automatically discontinuing the traverse of the bucket upon the boom, this being timed in respect to both the outward and the inward movements of the bucket relatively to the mixing machine by which the concrete is supplied thereto.

In the present design of boom and bucket distributing mechanism there is also proposed an improved device for causing the swinging of the boom in a horizontal plane to effect the proper distribution of the aggregates of different portions of the sub-grade. This feature of my invention is of importance and involves the worm and worm gear contrivances originally proposed in the Letters Patent Reissue No. 13,617, issued September 16, 1913, to Philip A. Koehring, said patent covering the basic machine improved by the features of my Letters Patent hereinbefore designated. In the operation of the worm and worm gear boom turning means, there has been a tendency heretofore to cause locking of the engaged worm and worm gear contrivances, owing to the momentum of the boom once the horizontal movement is imparted thereto. I merely mount my worm in a resilient manner as regards end-wise moving, in respect to the engaged worm gear, and in this way eliminate the possibility of the disadvantageous locking of the parts as referred to, at the same time rendering more easy the operation of the boom by said parts manually in respect to initiating as well as stopping said boom movement.

A full comprehension of the improvements of this invention will be had upon an understanding of the machines of the Letters Patent previously set forth herein in connection with the following description and the accompanying drawings in which:—

Referring to the drawings in which the same reference characters are used to designate corresponding parts in different views, and describing the improvements hereof in detail, A denotes the portion of the mixing drum of the mixing machine illustrated in conjunction with the boom and bucket mechanism, B the frame work of said machine, and C the toothed gear rings carried by said drum A and by which it is rotatably operated in a well known manner. The boom and bucket mechanism embodies as its primary features the boom 1 and the bucket 2, the latter spaced from the ground, power operated, and being normally non-discharging in its body construction.

Figure 12:
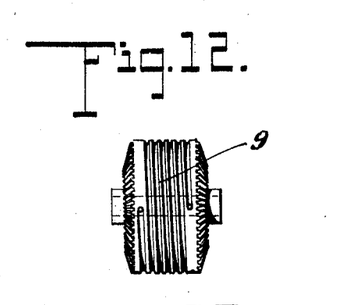
Figure 12 is a front view showing more clearly the winding drum of the driving mechanism.
Figure 13:
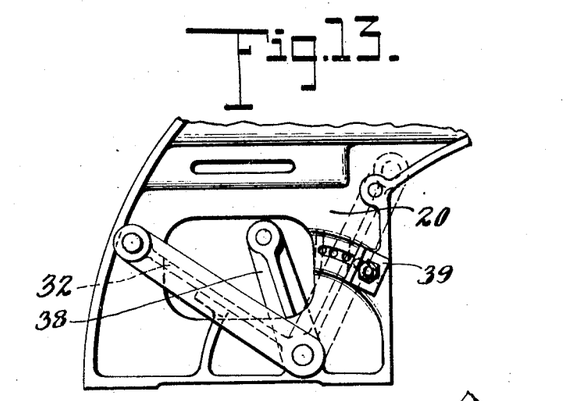
Figure 13 is an enlarged view showing more clearly the adjustable stop on the carriage.
Figure 14:
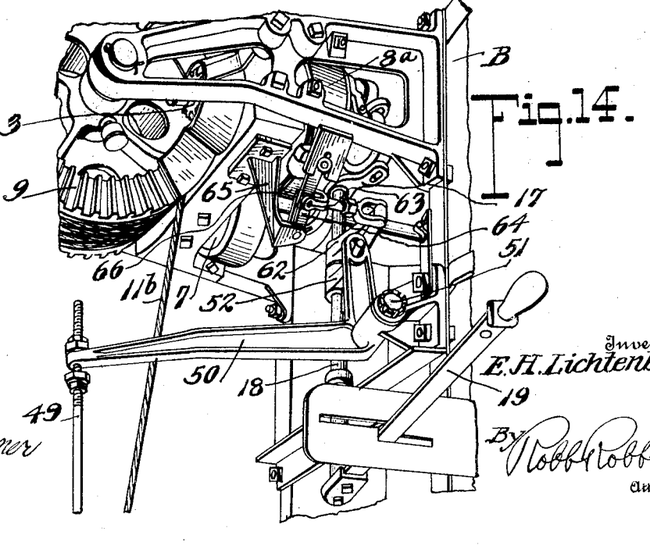
Figure 14 is a perspective view showing more clearly the arrangement of the lever arms and links of the clutch shifting and knock out devices.

The driving mechanism by means of which the bucket is caused to traverse the boom 1 comprises a pair of shafts 3 and 4 having pinions at one end meshing with the gear ring C of the drum A whereby motion is transmitted constantly to the shafts while the drum A is in operation. The shafts 3 and 4 are equipped with normally idle bevel gears 5 and 6 respectively, adapted to be operatively connected to turn with said shafts by means of clutches 7 and 8 respectively. The bevel gears 5 cooperate with the winding drum 9 formed with a spirally grooved winding surface, said drum having at opposite ends large bevel gears 10 with which the gears 5 and 6 mesh. The opposite ends 11$^a$ and 11$^b$ of an operating cable 11 wind around the drum 9 in opposite directions, and have the extremities thereof fixedly attached to the drum as shown best in Fig. 12 of the drawings. The said cable 11 extends from the end portion 11$^a$ down under a sheave journaled on top of the boom 1 thence outwardly along the boom around a sheave 13 at the outer extremity of said boom. From the sheave 13 the cable 11 is trained inwardly along the boom adjacent to its under side, said cable passing thence upwardly over a sheave 14 located adjacent to the point of pivotal support of the boom 1. At this point the cable 11 has its end 11$^b$ connected with the drum 9 in the manner previously suggested. The sheaves 12 and 14 are located so that the portions of the cable 11 passing over the same are substantially in vertical alinement with the axis of rotative movement of the boom 1 established by the vertical pivot 15. The pivot 15 connects the boom with the bracket 16 projecting from the frame B of the machine, said bracket forming the main support intermediate the boom and the frame work of the mixer.

Figure 3:
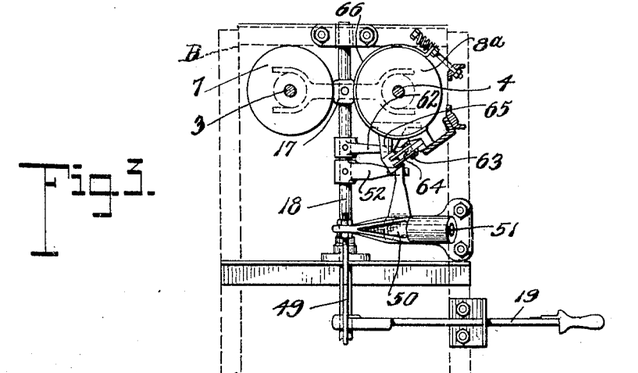
Figure 3 is a view looking toward the delivery or discharge end of the mixer and bringing out more clearly the controlling lever and clutch shifting mechanism and adjacent driving mechanism above the inner end of the boom.
Figures 5, 6, 7, 8:
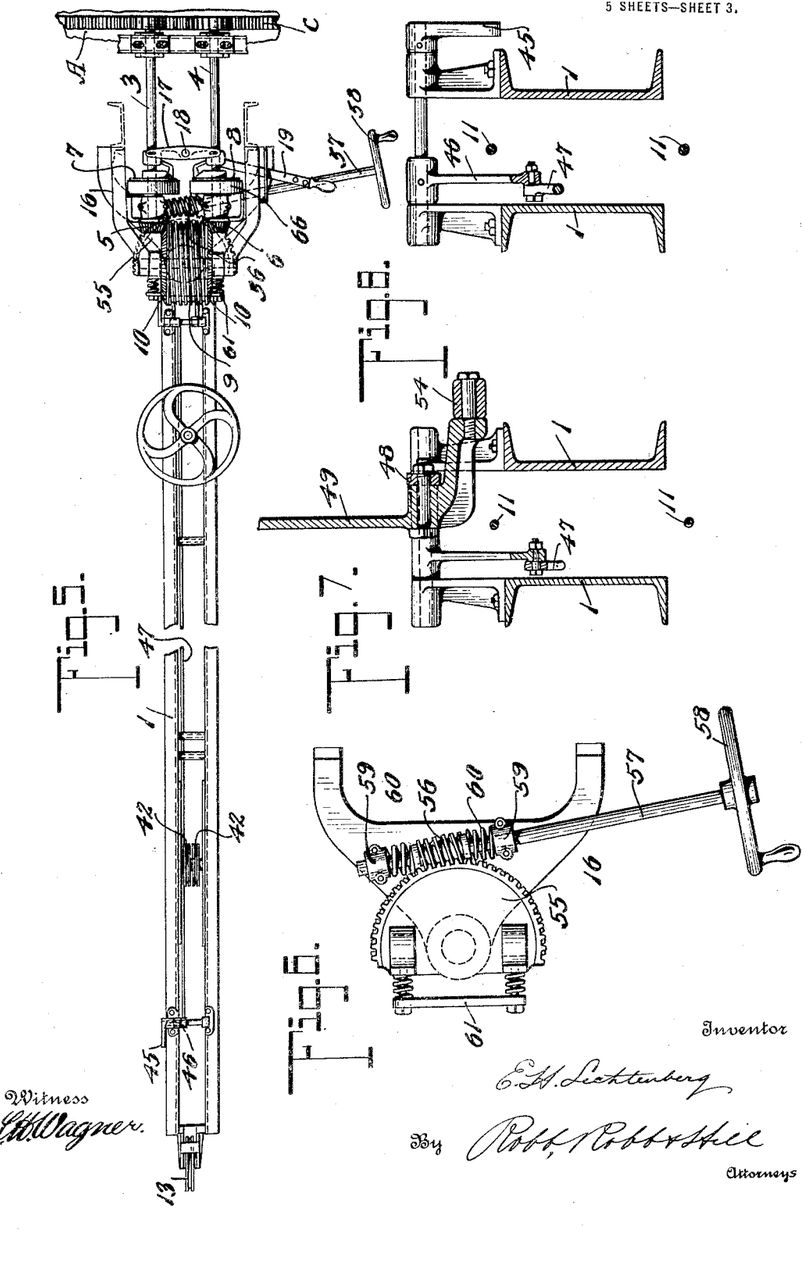
Figure 5 is a plan view showing primarily the parts illustrated in Fig. 1, the bucket and certain of the parts beneath the boom being omitted.
Figure 6 is a plan view bringing out clearly the worm and worm-gear turning device as improved, also the bumper cooperative with the carriage to limit the inward movement of the bucket on the boom.
Figure 7 is a vertical sectional view taken about on the line 7—7 of Fig. 2.
Figure 8 is a similar section taken about on the line 8—8 of Fig. 2.

To operate the clutches 7 and 8 a rocker lever 17 (see Figs. 3 and 5) is employed, the same being equipped with shifting forks and being mounted upon a vertical shaft 18, seen best in Fig. 3. The shaft 18 has a main hand lever 19 connected with its lower end and this lever is operable to alternately render the clutches 7 and 8 active for effecting reverse movements of the drum 9 and cable 11 or to maintain the clutches 7 and 8 in neutral positions.

Figure 4:
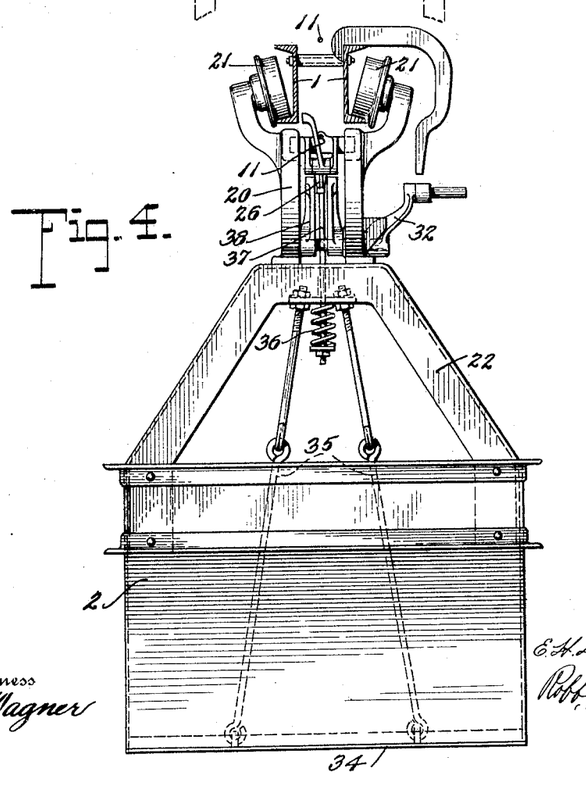
Figure 4 is a vertical sectional view through the boom and looking toward the outer side of the bucket, bringing out more fully the mounting of the carriage on the boom and bucket-door closing device.
Figure 9:
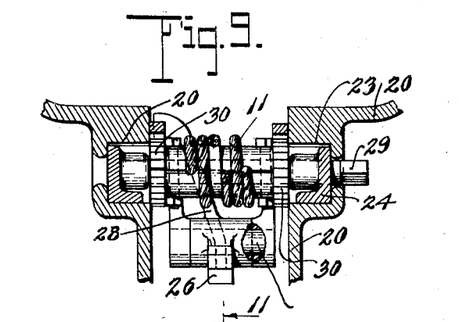
Figure 9 is a vertical section taken through a portion of the carriage showing the shuttle or slide of the tripping device.
Figures 10, 11:
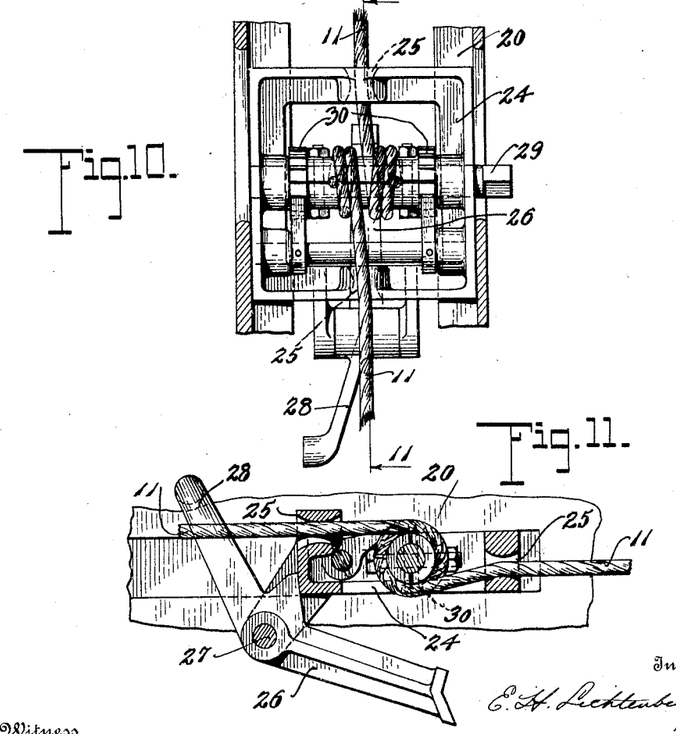
Figure 10 is a plan view of the same including a trip member.
Figure 11 is a section on the line 11—11 of Fig. 10.

The reverse operation of the drum 9 is effective to cause reverse movement of the bucket 2 relative to the boom 1 by interconnections between the cable 11 and the carriage 20, which interconnections are very similar to those set forth in my previous Patent No. 1,141,470. The carriage 20 has the rollers 21 which are adapted to travel in the channels of the beams which comprise the boom 1, as shown best in Fig. 4. The bucket 2 is supported by the carriage 20 through the provision of hangers 22, and the method of attachment of the cable 11 to the carriage 20 is best shown in Figs. 9 to 11. For the above purpose I provide on the carriage 20, slidable in suitable ways or grooves 23 at opposite sides of the latter, a slide or shuttle 24. The slide or shuttle 24 has end bars with openings 25 through which the cable 11 passes and mounted on the shuttle member 24 is a trip 26 pivoted at 27 and having an upwardly extending arm 28. Centrally of the slide or shuttle 24 there is mounted a slack take-up shaft 29 equipped with ratchet wheels 30 and about which the cable 11 is wound so as to extend from the shaft in opposite directions. It will be evident that by turning the shaft 29 by the application of any suitable tool, any unnecessary slack in the length of the cable 11 may be taken up.

The action of the trip 26 is very similar to the action of certain corresponding trip mechanism of my previous Patent No. 1,141,470, and will be generally set forth hereinafter.

Reverse movement of the cable 11 imparts corresponding movement to the carriage 20, and said carriage supports the bucket 2 for a corresponding movement of the latter. I utilize my previously invented and well known cam 31 to cooperate with an arm 32 on the shaft 33 for the purpose of closing the bottom door 34 of the bucket 2. The bottom door 34 is connected by linkage 35 and spring 36 with the curved link 37 which in turn is attached to the throw over arms 38 projecting from the shaft 33 all substantially as disclosed in my last named letters patent.

The design of my bucket 2 and the openable door 34 is especially novel and important. The door 34 is of a length corresponding to the width of the bucket 2, and said door is variably limited in its opening movement by means of an adjustable stop 39 which is attached to one side of the carriage 20 and adjustable lengthwise of said carriage by means of a suitable bolt passing through the said stop. The stop coacts with the arm 32 to limit the movement of said arm in the direction of the mixer, as the arm is shifted to throw over action of the arms 38 under the influence of the trip 26. That is to say, the door 34 can open just so far as is determined by the movement of the arm 32 in the action of tripping the door 34 to effect said opening. It is the adjustability of the stop 39 which admits of the flowing of the concrete aggregates from the bucket 2 in a ribbon-like stream, the thickness of which depends upon the extent of opening of said door, and due to retarding egress of the aggregates because of the restriction of the door opening. Necessarily the thickness of the stream of materials discharged from the bucket 2 determines the depth of the layer of concrete or aggregates dispensed, so to speak, by the bucket. The bucket opening and door 34 are advantageously arranged transversely of the boom, and of the direction of travel of the bucket 2, for the attainment of the above result of depositing the plastic aggregates in a layer of measured thickness. The bucket 2 is designedly a low discharge bucket; in other words, the discharge end of the bucket is very near the ground so as to admit of the laying down of the concrete in a relatively thin ribbon-like gravitating stream of a width equal to the width of the bucket and of a depth regulated by adjustment of the stop 39 controlling the operative area of the opening made by release of the door as the latter drops to its effective opening position.

Figures 1, 2:
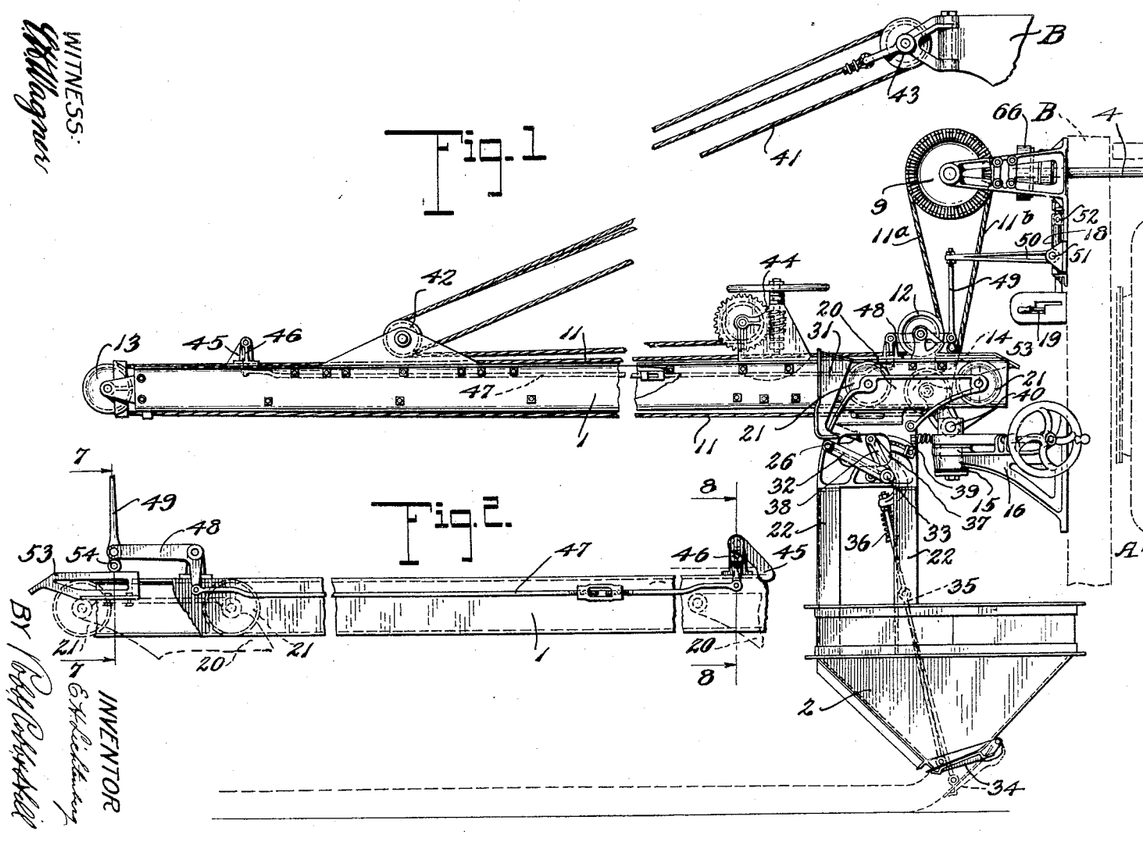
Figure 1 is a side view showing particularly the boom and bucket attachment as designed with the present improvements, dotted lines indicating in a general way the adjacent end portion of the mixing machine upon which the boom and bucket mechanism is mounted.
Figure 2 is a fragmentary view showing more particularly the automatic stop mechanism at opposite ends of the boom for cooperation with the driving gearing to render the latter inactive at proper times.

The boom 1 is adapted to be raised and lowered by vertical movement of an axis established by the horizontal pivot 40 connecting the boom with the vertical pivot 15 on the bracket 16. The means utilized for this purpose are like those heretofore proposed including a cable 41 attached to the upper frame work B of the machine (see Fig. 1) passing around a sheave 42 on the boom 1 intermediate the ends of the latter, thence passing up and around another sheave 43 on the frame work sections, down again around a second sheave 42, co-axial with the previous sheave 42, and thereafter passing to a windlass device shown at 44 as mounted on the boom 1 adjacent to the inner end of the boom.

On the boom 1 there is provided certain automatically operating clutch knock out mechanism for the clutches 7 and 8. This mechanism is seen best in Figs. 2 and 3 of the drawings. In the outward traverse of the carriage 20 with the bucket 2, if the operator does not reverse the movement of the cable 11 by manual control of the clutches through the lever 19, said carriage will strike the knock out or shifter arm 45 located adjacent to the outer end of the boom and pivoted to a bracket 46 thereon. The arm 45 is equipped with a pull rod 47 extending longitudinally of the boom intermediate the channels thereof. When the knock out or shifter arm 45 is rocked upward a pull is exerted on the rod 47 and said rod actuates a bell crank lever 48 near the inner end of the boom in such a manner as to pull downwardly upon a bar 49 which is attached to another bell crank lever 50 which is pivoted at 51 on the frame work B. The vertical arm or lever 50 is connected with a horizontal arm 52 and offstanding from the shaft 18 which it will be recalled is the controlling shaft for the shifting yokes of the clutches 7 and 8. Obviously movement imparted to the bell crank lever 50 in the above manner will shift the arm and therewith the shaft 18 to move the shaft into a position in which the clutches 7 and 8 are neutral or reversed. In this way the drive of the cable 11 is discontinued or reversed automatically through the knock out device under the initial actuation of the knock out lever 45. On inward movement of the carriage 20, in order to automatically neutralize or render ineffective the one of the clutches 7 or 8 which is employed to cause return movement of the carriage upon the boom, there is provided a cam 53, seen best in Fig. 2, and this cam is adapted to ride beneath the roller 54 on the bottom of the bar 49, thereby raising said bar and effecting the operation or knock out of the effective clutch by which the return movement of the carriage and bucket is being caused. This action will be obvious with the previous description of the clutch neutralizing operation from the knock out member 45 and the principle of operation is quite similar to that found in my Letters Patent No. 1,113,661 previously referred to.

There is left to be described the means for turning the boom 1 by movement in a horizontal plane, said means involving generally the previously well known worm gear sector 55 fixed on the pivot 15 by which the boom is supported for said horizontal movement. This worm gear is engaged by a worm 56 on the manually rotatable shaft 57 adapted to be turned by the wheel 58. The worm 56 may be said to be a floating worm to the extent that it is movable endwise on the shaft 57, though of course, splined thereto to turn therewith. The worm operates between boxes 59 in which the shaft 57 is journaled on the bracket 16 and springs 60 are interposed between said boxes 59. On turning the shaft 57 to swing the boom 1 horizontally, the initial action of the worm 56 is to yield by compression of one of the springs 60, the one in the direction opposite that in which the boom will turn. After slight compression of said spring, the boom will begin to swing and the worm will become centralized between the boxes 59 under the action of the springs. On stoppage of the turning movement of the shaft 57, if there is continued movement of the boom under the impetus of its swing produced by manual operation of the wheel 58, said worm 56 will yield longitudinally on the shaft 57 and there will be no tendency for the parts 55 and 56 to become locked by the friction incident to the action of the worm 56 as a stop for limiting the movement or swinging of the boom. There is mounted upon the worm gear 55 a yieldable bumper 61 with which the carriage 20 may abut as it reaches the inward limit of its movement in traversing the boom 1. The bumper includes a plate, and two springs interposed between said plate and two pivot lugs on the gear 55.

It is furthermore notable that the lever 50 controlling the reversing or clutch neutralizing action previously described is adapted to perform an additional function to that of rendering the clutch 8 ineffective. The operation of this lever to turn the shaft 18 is adapted to turn an arm 62 just above the arm 52 of the shaft 18. The arm 62 is connected by links 63 with the toggle lever 64 interposed between a bracket 65 on the frame work, and the free end of a brake band 66 which partially encircles the clutch member $8^a$, cooperates with the clutch 8. Thus it is that through the operation of the automatic clutch knock-out mechanism acting on the lever 50 or by the control of the shaft 18 through the hand lever 19 previously described, the parts 62, 63 and 66 may be operated to apply a brake to the clutch $8^a$ and thus brake the operation of the pinion 6 operating the adjacent drum 9. In this way quick reduction of the movement of the drum and corresponding stoppage of the movement of the bucket outwardly and inwardly is controlled.

The general operation of my machine according to the design hereinbefore described is as follows:

The bucket 2 is filled by the customary discharging of a predetermined quantity of concrete or mixed aggregates from the mixer drum A into said bucket. The aggregates are now ready to be distributed or laid upon the sub-grade for which purpose the operator will manually actuate the lever 19 to throw into operation the clutch mechanism whereby to drive the drum 9 in the direction to effect an out-haul movement of the lower bight of the cable. The initial out-haul movement causes the trip member 26 to assume an operative position on the outer side of the upper end of the arms 38 and continued out-haul movement causes the carriage 20 and the bucket 2 to traverse the boom 1 until the operator reverses the movement of the cable 11 by proper control of the clutch mechanism. On reversing the movement of the cable 11 the slide or shuttle member 24 moves in the direction of the inner end of the boom, the trip member 26 actuates the throw-over arms 38, rocks the shaft 33 and releases or opens the door 34 of the bucket. The mixed aggregates in the bucket are in a free flowing state and the reversing of the cable movement is intended not only to effect opening of the door 34, but also immediate return transverse of the bucket 2 relative to the boom 1. The combination of the door opening and the return traverse movement of the bucket 2 are important to my invention because such actions together are effective to stream the aggregates from the bucket 2 in a ribbon-like layer of substantially rectangular cross-section as previously described, the thickness or depth of which layer is controlled by the stop 39. As the bucket 2 returns to its position adjacent to the mixer and at the inner end of the boom 1, the cam 31 engages the crossarm 32, restores the throw-over arms 38 to their elevated bucket door closing positions, and automatic stopping of the carriage 20 and bucket 2 is effected through the action of the clutch knock-out mechanism hereinbefore described.

If the operator fails to cause a reverse movement of the cable 11 by operation of the lever 19 manually the effective action of the bucket discharge will begin to take place as the bucket reaches the outer end of the boom. This will be performed automatically through the carriage 20 abutting with and operating the knock-out or shifter arm 45 of the clutch mechanism controlling the drive means. Furthermore, the operation of the arm 45 will be such as not only to render inactive the clutch controlling the out-haul movement of the cable, but to render active the clutch which embodies the in-haul movement of said cable whereby the movement of the bucket 2 will be actually reversed so as to insure the laying of the concrete by streaming of the same out of the bucket 2 in the manner above set forth.

The method which I practice in the actual operation of my machine is the conveying or conducting of the aggregates mixed in the mixer to the site of deposit, by the distributing element or bucket of course, and then while the aggregates in their plastic condition are in movement they are caused to flow gravitatively from the bucket in a continuous stream of a predetermined depth or thickness substantially equal to that of the slab or portion of pavement of which the particular batch of the aggregates will ultimately form a part. By this method laborous work in spreading the materials is saved. This is a novel method of my invention.

The action of the brake-band 8ª is incident to straightening of the links of the toggle lever 64 and takes place on both the inhaul and outhaul movements of the bucket 2.

Whether the operation of the member 45 effects mere neutralizing of the clutch devices requiring the reverse movement of the bucket to be effected by manual operation, or reversing of the clutch mechanism and inhaul movement of bucket 2 depends on the adjustment of the arm 45, and the latter is controlled by adjustment of turn buckle 47ª in the length of the rod 47, or in any suitable manner.

Of course the dumping and reverse movement of bucket 2 may be performed at any point in the outward movement of the bucket, as well understood on reference to my previous patents.

It is notable that as the portion 11ª of the cable unwinds from the spiral groove of the drum 9, the portion 11ᵇ winds into the vacated part of the groove, and vice versa.

Having thus described my invention, what I claim as new and desire to secure by Letters Patent, is:—

1. In a concrete distributing machine, a distributing element, an elevated support to carry this element in spaced relation to the ground, means for controlling delivery of plastic concrete by said element in a layer of measured thickness, and power operating means for the distributing element and delivery controlling means.

2. In a concrete distributing machine, an elevated support a distributing element suspended from said support and normally in a non-discharging condition and adapted to permit gravitative discharge of materials to be distributed, and means to control the delivery of said materials by said element in a layer of measured thickness when discharging.

3. Means as set forth in claim 1, combined with an instrumentality for varying the thickness of the layer of concrete delivered according to predetermined requirements.

4. In a concrete distributing machine, the combination of a portable support, a boom thereon to operate over a concrete distributing area, a normally non-discharging distributing bucket adapted to traverse said boom and having a discharge opening elongated transversely of its direction of traverse to form a relatively wide transverse discharge for the bucket, and operating means to bring the said opening into action to discharge the contents of the bucket when the latter has moved to the desired point of deposit upon a sub-grade, with means to move the bucket as discharged, whereby the concrete in the bucket is spread over an area of relatively large width as it passes from the opening to the sub-grade.

5. In a concrete distributing machine, a source of supply of plastic concrete, a distributing element, a boom from which said element is suspended, means to move said element over and spaced from an area of distribution to and from said source of supply, and means to cause materials to pass from said element in a stream-like layer of predetermined thickness, said last means operating during a certain portion of the said movement of the distributing element.

6. In a concrete distributing machine, a source of supply of plastic concrete, a distributing element, a boom from which said elements is suspended, means to move said element in spaced relation to but over a surface to be paved and close to said surface so that materials delivered by the element may retain substantially the form of their delivered condition while gravitating to said surface, operating means to carry the distributing element over an area of distribution, and means adapted to control streaming of the materials from the element during such movement.

7. In a concrete distributing machine, a distributing element, a support therefor upon which it moves, means to move said element over a surface to be paved and spaced therefrom but close to said surface so that materials delivered by the element may retain substantially the form of their delivered condition, and means to simultaneously cause discharge of the materials in a stream and to cause movement of the distributing element as the materials pass therefrom.

8. In a concrete distributing machine, a normally non-discharging distributing element comprising a conveyer, means to move said element over a surface to be paved and close to said surface so that materials conveyed and delivered by the element may retain substantially the form of their delivered condition, and means to simultaneously cause discharge of the materials in a stream and cause movement of the distributing element as the materials pass therefrom, the distributing element comprising a part to predetermine the thickness of the stream of material passing therefrom, and being arranged to operate close to the surface on which the materials are to be received therefrom.

9. In a concrete distributing machine, adjustable trip means to effect delivery of its contents, a distributing element, and means for controlling delivery of plastic concrete by said element in a layer of measured thickness variable by adjustment of the trip means.

10. In a concrete distributing machine, a normally non-discharging distributing element, means for controlling delivery of plastic concrete by said element in a layer of measured thickness, and means to at a predetermined time simultaneously cause delivery action of the concrete from said element and movement of the distributing element during such delivery action.

11. In a concrete distributing machine, a distributing element, and means for controlling delivery of plastic concrete by said element in a layer of measured thickness, the distributing element comprising an openable door, and means to vary the degree of opening movement of the door to thereby vary the thickness of the layer of plastic material distributed through said door.

12. In a concrete distributing machine, a distributing element, and means for controlling delivery of plastic concrete by said element in a layer of measured thickness, the distributing element comprising an openable door, and means to simultaneously open the door and effect bodily movement of the distributing element.

13. In a concrete distributing machine, a distributing element, means for controlling delivery of plastic concrete by said element in a layer of measured thickness, the distributing element comprising a discharging means, and means to simultaneously render the discharging means active and effect bodily movement of the distributing element in such a manner that the plastic materials stream out behind it in such movement.

14. In a concrete distributing machine, the combination of a boom, a distributing bucket adapted to traverse said boom, propelling means for said bucket, the bucket comprising an openable door for regulating the flow of plastic materials from the bucket, and means to variably limit the opening movement of the door.

15. In a concrete distributing machine, the combination of a boom, a distributing bucket adapted to traverse said boom, propelling means for said bucket, the bucket comprising an openable door disposed substantially transverse to the direction of propulsion of the bucket for regulating the flow of plastic materials from the bucket, and means whereby the door may be opened so as to permit a retarded streaming out of the plastic materials in the bucket and simultaneous movement imparted thereto to cause the contents of the latter to be discharged in a ribbon-like manner.

16. In a boom and bucket concrete distributing means, in combination, a boom, a bucket to traverse the boom and equipped with a discharge opening, driving means for causing the traversing movement of the bucket on the boom, means to restrictively render operative the discharge opening, so that the contents of the bucket will stream therefrom in a retarded manner, and means for causing the driving means to move the bucket over a distributing area after said opening of the bucket becomes operative, the bucket being arranged so that its discharge opening is near the surface on which the contents of the bucket are to be deposited whereby the bucket contents stream to the surface in a relatively flat layer.

17. In concrete distributing means, in combination, a boom, a bucket to traverse the boom, a discharging door for said bucket, and an adjustable stop controlling the degree of opening movement of said door.

18. In concrete distributing means, in combination, a boom, a bucket to traverse the boom, a discharging door for said bucket, an adjustable stop controlling the degree of opening movement of said door, trip mechanism connected with the door and cooperative with said stop, and means for moving the bucket.

19. In concrete distributing means, in combination, a boom, a bucket arranged to traverse the boom, a carriage supporting said bucket on the boom, the bucket being formed with an inclined bottom and having a discharge operating close to the surface to which materials are to be discharged from the bucket, and means to simultaneously open the discharge door of the bucket and impart movement to the latter to cause the contents of the same to stream past said door in a layer of predetermined thickness.

20. In a concrete distributing machine, the combination of a boom, a bucket adapted to traverse the boom, driving mechanism for the bucket, said bucket including a door openable to a predetermined position to regulate the thickness of the stream of materials discharged from the bucket, means to drive the bucket in one direction along the boom, and means for automatically reversing the movement of the bucket upon said boom.

21. In a concrete distributing machine, the combination of a boom, a bucket adapted to traverse the boom, driving mechanism for the bucket, a door for the bucket, means to control opening of the door to a predetermined position to regulate the thickness of the materials discharged from the bucket, means to drive the bucket in one direction along the boom, means to automatically reverse the movement of the bucket upon said boom, and for simultaneously opening the door of the bucket whereby the combined opening of said door, its arrangement in the bucket and the movement of the bucket will cause the contents of the latter to stream from the bucket in a ribbon-like layer of predetermined thickness.

22. A machine substantially as claimed in claim 25, combined with a control device for variably limiting the opening movement of the door of the bucket, whereby to admit of changing the thickness of the layer of materials discharged from the bucket.

23. In a concrete distributing machine, the combination with a boom shiftable over an area of distribution of concrete aggregates, a normally non-discharging concrete distributing element mounted to move along said boom from a source of supply of concrete aggregates, means to supply concrete aggregates to said element, said element being provided with an opening capable of being brought into action to discharge the concrete from said body upon a sub-grade in a layer-like form, the distributing element being freely movable back and forth upon the boom from the supply means to a point of distribution, and means to cause discharge action of the distributing element to stream the concrete through its opening in a layer of measured thickness to thus avoid laborious spreading work necessary were the contents of the distributing element dumped upon the sub-grade en masse.

24. In a concrete paving machine, in combination, a portable support, a boom movable on said support over an area of distribution, a conveying receptacle adapted to traverse the boom from a place in which it receives concrete to a place for discharge thereof, said receptacle being constructed so that the concrete in plastic state may readily gravitate therefrom, but being normally in a non-discharging condition, so that its contents may be retained until a desired time of discharge, the receptacle having discharging equipment enabling its contents to freely flow therefrom in a streamed out layer, means for rendering the discharging equipment operative, and to move the receptacle at the same time to lay the concrete over a sub-grade area of considerable extent, while said discharging equipment remains operative, thereby to avoid laborious spreading work respecting the distributed concrete, and means to restore the receptacle to its normal non-discharging condition.

25. A concrete paver substantially as claimed in claim 24, combined with adjusting means for the discharging equipment whereby the concrete discharged therefrom may be deposited in layers of different thicknesses dependent upon the adjustment of the said equipment.

26. A concrete paver substantially as claimed in claim 24, characterized in that the means to move the receptacle during the discharging action is such that the contents of the receptacle discharges therefrom in a direction opposite that in which the receptacle is moving.

27. In a boom and bucket type concrete distributer machine, a boom, a power operating bucket arranged to traverse said boom, comprising a discharge opening, and means restrictively controlling egress of the contents of the receptacle from the said opening, as the receptacle moves, so that said contents are retarded and caused to become deposited upon a road surface in a layer of measured thickness.

28. In a concrete paver of the boom and bucket type, the combination of a boom, a portable support for the boom, and a power operated bucket arranged to traverse the boom, said bucket having a bottom inclining in the direction of its traverse, and also having a discharge opening at the lower extremity of said bottom and means to restrictively control the passage of the contents of the bucket therethrough, so as to retard such passage and cause the contents to stream out of the bucket in a layer-like form in discharging, with means for causing a movement of the bucket as it is discharging.

In testimony whereof I affix my signature.

ERICH H. LICHTENBERG.